(12) United States Patent
Patra et al.

(10) Patent No.: US 6,725,326 B1
(45) Date of Patent: *Apr. 20, 2004

(54) TECHNIQUES FOR EFFICIENT MEMORY MANAGEMENT FOR LONGEST PREFIX MATCH PROBLEMS

(75) Inventors: Abhijit Patra, Santa Clara, CA (US); Rina Panigrahy, Sunnyvale, CA (US); Samar Sharma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 694 days.

This patent is subject to a terminal disclaimer.

(21) Appl. No.: 09/639,387

(22) Filed: Aug. 15, 2000

(51) Int. Cl.$^7$ ................................................ G06F 12/00
(52) U.S. Cl. ............................ 711/108; 365/49; 380/28
(58) Field of Search ......................... 711/108; 713/160; 365/49

(56) References Cited

U.S. PATENT DOCUMENTS

| | | |
|---|---|---|
| 5,088,032 A | 2/1992 | Bosack |
| 5,319,763 A | 6/1994 | Ho et al. |
| 5,481,540 A | 1/1996 | Huang |

(List continued on next page.)

FOREIGN PATENT DOCUMENTS

WO    WO 90/04849    * 5/1990

OTHER PUBLICATIONS

Donald R. Morrison, "Patricia—Practical Algorithm to Retrieve Information Coded in Alphanumeric," Journal of the ACM, vol. 15, No. 4, Oct. 1968, pp. 514–534.
Waldvogel et al., "Scalable High Speed IP Routing Lookups," Proc. SIGCOMM '97, ACM, 1997, pp. 25–36.
Lampson et al., "IP Lookups Using Multiway and Multicolumn Search," Proc. Infocom 98, Mar. 1998, 24 pages.
V. Srinivasan and George Varghese, "Faster IP Lookups using Controlled Prefix Expansion," ACM SIGMETRICS Performance Evaluation Review, vol. 26 No. 1, Jun. 1998, p. 1–10.
Stefan Nilsson and Gunnar Karlsson, "Fast Address Look–up for Internet Routers," Proceedings of IEEE Broadband Communications, Apr. 1998, 12 pages.

(List continued on next page.)

Primary Examiner—Kevin L. Ellis
Assistant Examiner—Thang H Ho
(74) Attorney, Agent, or Firm—The Law Office of Kirk D. Williams

(57) ABSTRACT

Techniques for efficient memory management that enable rapid longest prefix match lookups in memory. In general, the present invention is efficacious wherever maintenance of a good distribution of holes in a sorted list is required. This technique relies on a proactive hole management methodology to preserve a good distribution of holes in each memory region in such a way that one does not have to search for holes in order to insert or store a new entry into the list. In particular, all holes in a given region are kept in one or more contiguous sub-regions. Keeping the holes contiguous requires a hole move every time there is a delete operation. The amortized cost of these operations is justified by the resulting simplification in later insert (store) and delete operations. For example, during an insert the new entry is placed at the end of the contiguous sub-region of used entries in the region. During a delete, when a hole is created in the middle of a contiguous sub-region of used entries, the last used entry is moved into the hole, thus keeping the holes contiguous. Such an organization of holes and movement of used entries within a region is permissible within the longest prefix match type of lookup table, because all entries within a region, by definition, have an IP prefix of equal length.

40 Claims, 13 Drawing Sheets

U.S. PATENT DOCUMENTS

| | | | |
|---|---|---|---|
| 5,515,370 | A | 5/1996 | Rau |
| 5,528,701 | A | 6/1996 | Aref |
| 5,651,099 | A | 7/1997 | Konsella |
| 5,721,899 | A | 2/1998 | Namba |
| 5,740,171 | A | 4/1998 | Mazzola et al. |
| 5,781,772 | A | 7/1998 | Wilkinson, III et al. |
| 5,809,501 | A | 9/1998 | Noven ............................ 707/7 |
| 5,829,004 | A | 10/1998 | Au |
| 5,842,040 | A | 11/1998 | Hughes et al. |
| 5,848,416 | A | 12/1998 | Tikkanen |
| 5,884,297 | A | 3/1999 | Noven ............................ 707/1 |
| 5,898,689 | A | 4/1999 | Kumar et al. |
| 5,920,886 | A | 7/1999 | Feldmeier |
| 5,930,359 | A | 7/1999 | Kempke et al. |
| 5,956,336 | A | 9/1999 | Loschke et al. |
| 6,000,008 | A | 12/1999 | Simcoe |
| 6,018,524 | A | 1/2000 | Turner et al. |
| 6,061,368 | A | 5/2000 | Hitzelberger |
| 6,067,574 | A | 5/2000 | Tzeng |
| 6,091,725 | A | 7/2000 | Cheriton et al. |
| 6,097,724 | A | 8/2000 | Kartalopoulos |
| 6,115,716 | A | 9/2000 | Tikkanen et al. |
| 6,141,738 | A | 10/2000 | Munter et al. |
| 6,148,364 | A | 11/2000 | Srinivasan et al. |
| 6,181,698 | B1 | 1/2001 | Hariguchi |
| 6,236,658 | B1 | 5/2001 | Essbaum et al. |
| 6,237,061 | B1 | 5/2001 | Srinivasan et al. |
| 6,243,667 | B1 | 6/2001 | Kerr et al. |
| 6,289,414 | B1 | 9/2001 | Feldmeier et al. |
| 6,295,576 | B1 | 9/2001 | Ogura et al. |
| 6,298,339 | B1 | 10/2001 | Bjornson |
| 6,307,855 | B1 | 10/2001 | Hariguchi |
| 6,516,383 | B1 * | 2/2003 | Patra et al. ................. 711/108 |

OTHER PUBLICATIONS

William N. Eatherton, Hardware–Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324–334.

Lockwood et al., "Field Programmable Port Extender (FPX) for Distributed Routing and Queuing," Proceedings of the ACM/SIGDA international symposium on Field programmable gate arrays, Feb. 2000, pp. 137–144.

Ruiz–Sanchez et al., "Survey and Taxonomy of IP Address Lookup Algorithms," IEEE Network Magazine, vol. 15, No. 2, Mar./Apr. 2001, pp. 8–23.

Pankaj Gupta and Nick McKewon, "Algorithms for Packet Classification," IEEE Network Magazine, vol. 15, No. 2, Mar./Apr. 2001, pp. 24–32.

Iyer et al., "ClassiPI: An Architecture for Fast and Flexible Packet Classification," IEEE Network Magazine, vol. 15, No. 2, Mar./Apr. 2001, pp. 33–41.

Waldvogel et al., "Scalable High Speed Prefix Matching," ACM Transactions on Computer Systems, vol. 19, No. 4, Nov. 2001, pp. 440–482.

Jon P. Wade and Charles G. Sodini, "A Ternary Content Addressable Search Engine," IEEE Journal of Solid–State Circuits, vol. 24, No. 4, Aug. 1989, pp. 1003–1013.

Teuvo Kohonen, Content–Addressable Memories, 1987, pp. 128–129 and 142–144, Springer–Verlang, New York.

Brian Dipert, ed., "Special–purpose SRAMs Smooth the Ride," EDN, Jun. 24, 1999, pp. 93–104.

"Extending the LANCAM Comparand," Application Brief AB–N3, Rev. 1.0a Draft, Music Semiconductors, Milpitas, CA, Sep. 30, 1998, 4 pages.

"Advantages of CAM in ASIC–Based Network Address Processing," Application Brief AB–N11, Rev. 1.2a Draft, Music Semiconductors, Milpitas, CA, Sep. 30, 1998, 4 pages.

"Virtual Memory Applications of the MU9C1480A LAN-CAM," Application Note AN–N3, Rev. 1a, Music Semiconductors, Milpitas, CA, Sep. 30, 1998, 12 pages.

"Using the MU9C1965A LANCAM MP for Data Wider than 128 Bits," Application Note AN–N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN–N25, Rev. 0a, Music Semiconductors, Milpitas, CA, Oct. 1, 1998, 16 pages.

"Using Music Devices and RCPs for IP Flow Recognition," Application Note AN–N27, Rev. 0, Music Semiconductors, Milpitas, CA, Oct. 21, 1998, 20 pages.

"Wide Ternary Searches Using Music CAMs and RCPs," Application Note AN–N31, Rev. 0, Music Semiconductors, Milpitas, CA, Apr. 13, 1999, 8 pages.

* cited by examiner

TECHNIQUES FOR EFFICIENT MEMORY MANAGEMENT FOR LONGEST PREFIX MATCH PROBLEMS

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

BACKGROUND OF THE INVENTION

1. Field of the Invention

The present invention relates to memory management schemes for use in data communications, specifically packet routing.

2. Description of the Related Art

In routing of a packet in a modem data communication system, one of the many tasks to accomplish is to determine the longest Internet Protocol (IP) prefix match for a destination address derived from the packet header. Many systems exist for determining such matches, both in the context of Internet Protocol routing as well as other forms of routing and switching (such as those employed with the asynchronous transfer mode (ATM) communications). See for example, U.S. Pat. No. 5,809,501 to Noven, entitled *Method and System of Database Management and an Asynchronous Transfer Mode (ATM) Environment* and U.S. Pat. No. 5,884,297 also to Noven, entitled *System and Method for Maintaining a Table in Content Addressable Memory Using Hole Algorithms*. Both of these patents are incorporated herein by reference in their entireties.

Within routers and switches today, the process whereby the routing function is carried out is well known in the art. Part of that process is the step of determining whether or not a router is aware of the corresponding next hop destination for packet routing. This typically uses a lookup of certain elements of the packet or cell header in a table to determine packet routing. Ternary content addressable memory (TCAM) is a type of memory that supports such lookups, and in particular the longest binary prefix lookup commonly used in routers.

As is well-known in the art, a content addressable memory (CAM) lookup outputs an exact match: either the parameter to be looked up (i.e., the lookup key) is in the CAM table or it is not. If the key is found in the table, an exact match exists and the address in the CAM table where the entry was found is provided as the output of the lookup. TCAMs differ from CAMs in that a TCAM allows the user to mask off bits such that a lookup key is said to match a TCAM entry even if all bits in the key do not match the entry. In other words, by masking out certain bits in the TCAM as "don't care" bits, more than one lookup key can be said to match a TCAM entry. If several TCAM entries match the lookup key, the top-most one (i.e., the entry having the lowest address) is returned. This feature is useful in supporting the longest IP prefix lookup function because the object of the search is only to find the longest prefix match, not to find all exact matches.

Longest prefix lookups are commonly implemented using a TCAM by placing the prefix entries in descending order sorted by the length of prefix. FIG. 1 illustrates a prior art TCAM-implemented lookup table 100 containing these sorted prefix entries 110. The non-prefix bits of the IP address in the TCAM are masked off; the masked bits 150 are illustrated by dark cross-hatching. For Internet Protocol version 4 (IPv4), the IP addresses are 32 bits long: sorting these addresses into a TCAM thus creates a table having 32 different regions, where each region 1 consists of prefix entries of a length i, i being the number of unique bits in an entry.

FIG. 1 shows a representative prior art TCAM containing prefix entries 110 and holes 120. Regions 1 are further identified each from the others by the number of unique prefix bits contained therein: region 1-32 is 32 unique bits wide; region 1-31 is 31 bits (with the low order bit 1 masked off by the TCAM); and so on through region 1-1, which has the 31 low-order bits masked off. For example, entry 110-29 is in prefix region 1-29 and has 29 unique prefix bits and 3 bits masked off as "don't care" 150.

The lowest address entry is 110-32, in the 32-bit prefix region 1-32. The highest entry (in the bottom-most position) in TCAM table 100 is hole 120 in region 1-1.

FIG. 1 is only a representative illustration of a portion of a TCAM configured for longest prefix match lookups. One of ordinary skill in the art will readily understand that TCAMs of widths greater than 32 bits are commonly used and that the length ("depth") of the TCAM can vary.

In operation, lookup key 105 is compared to every entry 110 in TCAM 100. Note that hole 120 is not necessarily all zeros; in some embodiments of the present invention, the contents of a single bit (or a field having a plurality of bits) in the unmasked portion of the entry 110 signals that the entry is in fact a hole 120. The comparison of key 105 to all entries in TCAM 100 is done simultaneously by a bit-wise NOT(XOR) with every unmasked bit in every entry. If an AND function of the results of all of the NOT(XOR) operations for an entry 110 is TRUE, the all bits of that entry 110 match key 105. The address of the lowest-addressed (and therefore longest prefix) entry is provided to the TCAM output.

Note that in the upcoming standard Internet Protocol version 6 (IPv6), the IP address is 128 bits. IPv6 will thus necessitate a TCAM having 128 distinct IP prefix length regions.

Although the ability of the TCAM to rapidly produce longest prefix lookup matches is advantageous, it complicates the task of inserting and deleting new prefixes within the TCAM table. This is so because the TCAM table must be maintained in a prefix length sorted order. Though TCAM updates (inserts and deletes) are infrequent, a time consuming update mechanism steals valuable processor resources and potentially result in a dropping of packets. Such deleterious effects must be avoided if high packet switching/routing speeds are to be maintained. The problem is only exacerbated by the expected industry switch to the IPv6 architecture with its longer addresses.

An insert of a prefix of length i can be accomplished in one TCAM write cycle if there is a vacant entry in the $i^{th}$ region (e.g., hole 120 in region 1-32), otherwise the TCAM write may need to move a vacant entry from a neighboring region (e.g., region 1-31) in order to provide space in the $i^{th}$ region. In particular, if up to k regions on either side of the $i^{th}$ region have no vacant entries, then one would need to perform k moves to provide a space. Since the cost of a move (involving both reading and writing the entry) is much higher than that of a lookup, it is desirable to minimize the number of moves involved in TCAM updates.

In one prior art method commonly used, a "naive" algorithm for TCAM updates is employed. The naive (or "lazy") algorithm moves TCAM entries only when it needs to. A delete in a given region 1 creates a hole 120 in that region.

Conversely, an insert in a region 1 requires the presence of a hole 120 in that region in which to insert the entry. A region is referred to as a "full" region when it does not have any holes (e.g., region 1-30), and thus an insert into a full region requires moving a hole 120 into that region from the nearest non-full region 1. This may necessitate moving entries in adjoining regions as well, in order to make room. It is desirable that the number of moves required to supply a hole to a full region is minimized. Indeed, it is preferable to have some holes in each region to facilitate updating.

Consider a TCAM with a certain maximum number of entries. One can readily see that some routing applications could use enough IP prefixes to result in a TCAM occupancy rate of 90% or more. In fact, such occupancy rates are commonly seen in the art today. A 90% occupancy rate implies that 10% of the TCAM entries are holes. A "good distribution" of these holes is one where they are almost equally distributed among the 32 regions (in an Pv4 system) so that one does not encounter a full region during any insert. Obviously, a "bad distribution" is one where several full regions occur contiguously, resulting in the requirement for a number of moves in order to provide a hole to support an insertion.

A good TCAM update algorithm will thus try to ensure that if one starts with a good distribution of holes among the regions, then after several updates the hole distribution will remain good. The naeve algorithm unfortunately gets stuck in a bad distribution once it reaches that state and never recovers on its own. If k full regions occur contiguously at any point, then the naive algorithm incurs an average cost of k/2 moves for every future insert into one of those regions. For example, if the lowest-addressed one third of the prefix regions in the TCAM increase in size by 10%, they will borrow holes from the middle third. This can result in a complete lack of holes in the middle region, which is too large for a naive algorithm to compensate. This cost results in a packet processing delay, which can in turn cause packet drops.

A study of the problem has indicated that a good TCAM update algorithm has the following desirable properties:

Given a good distribution of holes among regions, the distribution should tend to remain good after several updates.

Even if the TCAM is forced into a bad distribution, the update algorithm should automatically recover to a good distribution with future updates.

These properties can be achieved by performing a single (or a few) smart, proactive moves with every TCAM insert. These extra moves are performed to obtain and maintain an equal hole distribution among regions.

Another basic problem with the prior art naive algorithm is that, even if there are holes within a region available for insert, one still needs to search for them, again incurring undesirable delays. Because these holes may be scattered throughout the region, finding one can become an expensive task in terms of processor resources. There are presently two approaches commonly used in such situations.

1. Go through the entire region looking for available holes. This method is time consuming and thus could lead to packet drops.

2. Maintain a doubly-linked list of holes for each region and use that data structures to locate a hole. Though this approach allows us to locate a hole in a constant amount of time (independent of the size of the region, number of holes, and the number of regions,a period represented in algorithmic analysis literature as order-1 or "O(1)" time complexity), it requires maintaining complicated data structures in the TCAM controller. Any hardware or firmware implementation of the TCAM controller would thus consume additional (and scarce) memory and code space resources.

What is needed is an efficient algorithm for TCAM updates that establishes a good distribution of holes among regions, maintains that good distribution over multiple inserts and deletions, and provides a rapid method for locating and utilizing holes in a given region.

SUMMARY

Presently disclosed are techniques for efficient memory management that enable rapid longest prefix match in TCAMs. The present invention is equally applicable to other types of memory besides TCAMs, as well as for memory lookup schemes other than those used for longest prefix match. In general, the present invention is efficacious wherever maintenance of a good distribution of holes in a sorted list is required. This technique relies on a proactive hole management methodology to preserve a good distribution of holes in each TCAM region in such a way that one does not have to search for them in order to effect an insertion. In particular, all holes in a given region are kept in one or more contiguous sub-regions. Keeping the holes contiguous requires a hole move every time there is a delete operation. The amortized cost of these operations is justified by the resulting simplification in later insert and delete operations. For example, during an insert the new entry is stored at either end of the contiguous section of used entries in the region. During a delete, when a hole is created in the middle of a contiguous sub-region of used entries, the last used entry is moved into the hole, thus keeping the holes contiguous. Such an organization of holes and movement of used entries within a region is permissible within the longest prefix match type of lookup table, because all entries within a region, by definition, have an IP prefix of equal length.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

Introduction

Figure 2:
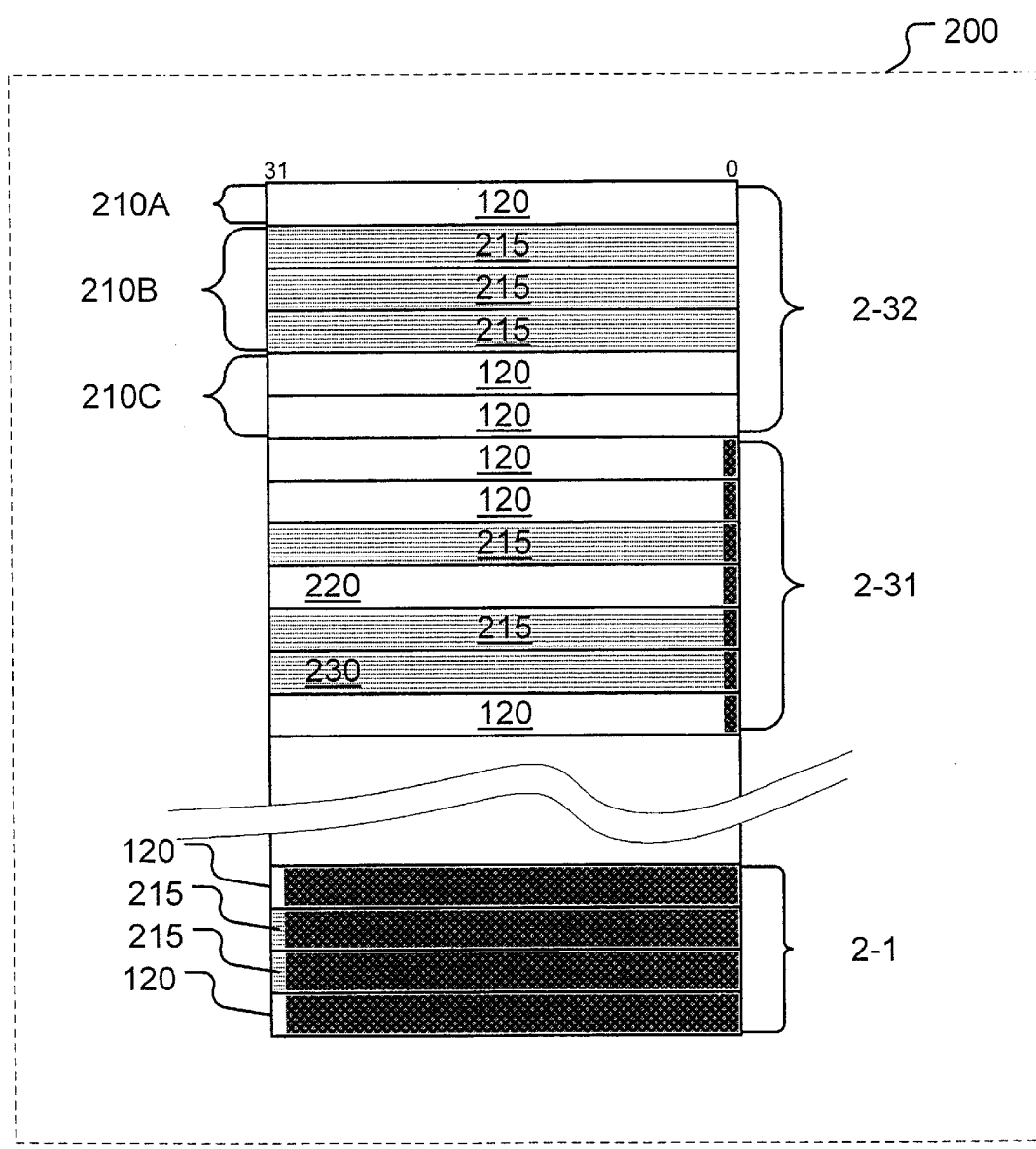
FIG. 2 illustrates a structure of a part of an IP prefix table implemented according to one embodiment of the present invention.

In order to facilitate efficient updating of the lookup table, the present invention relies on keeping the holes contiguous within each prefix length region 2 (referring now to FIG. 2). In order to do this, one must perform a hole move every time there is a delete operation. In particular, during a delete when a hole is created in the middle of a contiguous sub-region or section of used prefix entries (e.g., hole 220 in region 2-31), one must move the last used entry into the hole, thus creating a new hole contiguous with the previously existing holes and filling in the hole created by deletion.

During an insert, on the other hand, the new entry is placed at either end of the contiguous sub-region of used entries, thereby consuming a hole without creating any discontinuities. In order to implement this scheme, one must maintain pointers to the beginning and end of the contiguous sub-region of holes for each region. This process is further discussed below.

In one embodiment of the present invention, each region 2 in TCAM table 200 is maintained in the format of FIG. 2: first a contiguous sub-region 210A of one or more available entries, i.e., holes 120, followed by a contiguous sub-region 210B of one or more occupied ("used") entries 215, followed by another contiguous sub-region 210C of one or more holes 120 in region 2-32. (Note that region 2-32 is used here for illustrative purposes only; each region can have a similar organization and may or may not include holes.). Thus each region 2 in the table begins with holes and ends with holes.

In some embodiments of the present invention, each new entry is placed either at the beginning or at the end of the contiguous section of used entries 210B, alternating on each insertion. Likewise, during a deletion when a hole 120 is created in the middle of the contiguous section of used entries (e.g., hole 220 in region 2-31), the method alternates moving the last or the first used entry into this hole to keep two nearly equal sized sections of contiguous holes on either side of the used region. For example, entry 230 would be moved into hole 220 to keep the used entries in region 2-31 contiguous.

Alternatively, new entries may be placed at one end of a used entry section. Replacement moves may be made from the same end to fill in holes within the used entry section. In this alternative, a single contiguous hole sub-region is only required on the end of the same-length prefix region where the new entries are written, rather than on both ends of the region.

Distribution Algorithms

As noted above, if one ignores hole distribution, other efficiency problems arise. Accordingly, the desired algorithm (or algorithms) must try to maintain an equal distribution of holes among regions, preferably by performing an extra move with each insertion. A good algorithm must transfer holes from the region rich in holes to regions poor in holes and to thus turn a bad distribution into a better distribution. One constraint on this process is that moves to equalize the hole distribution should not be concentrated or clumped around individual inserts. Such an implementation would necessarily incur higher, as well as unevenly distributed, costs for each move. As discussed above, such increased costs (in terms of processor resources) can result in undesirable packet drops.

Alternative embodiments of the present invention are as follows. The details of the basic building block (or fundamental steps) repeated in all alternate algorithms are presented in the discussion of Option Zero only, for the sake of clarity.

Figure 3:
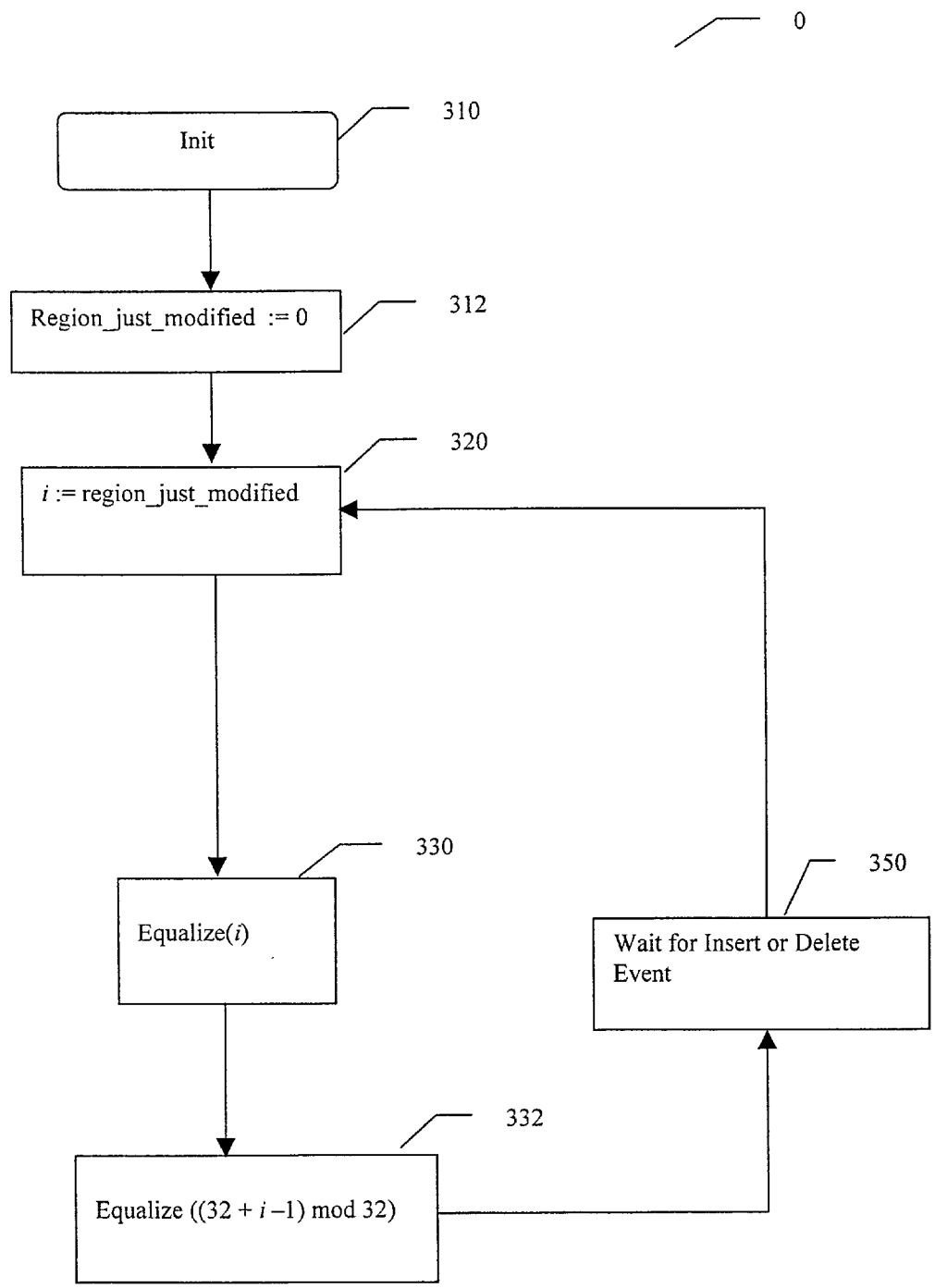
FIG. 3 is a flowchart of the method according to the Option Zero embodiment of the present invention.
Figure 4:
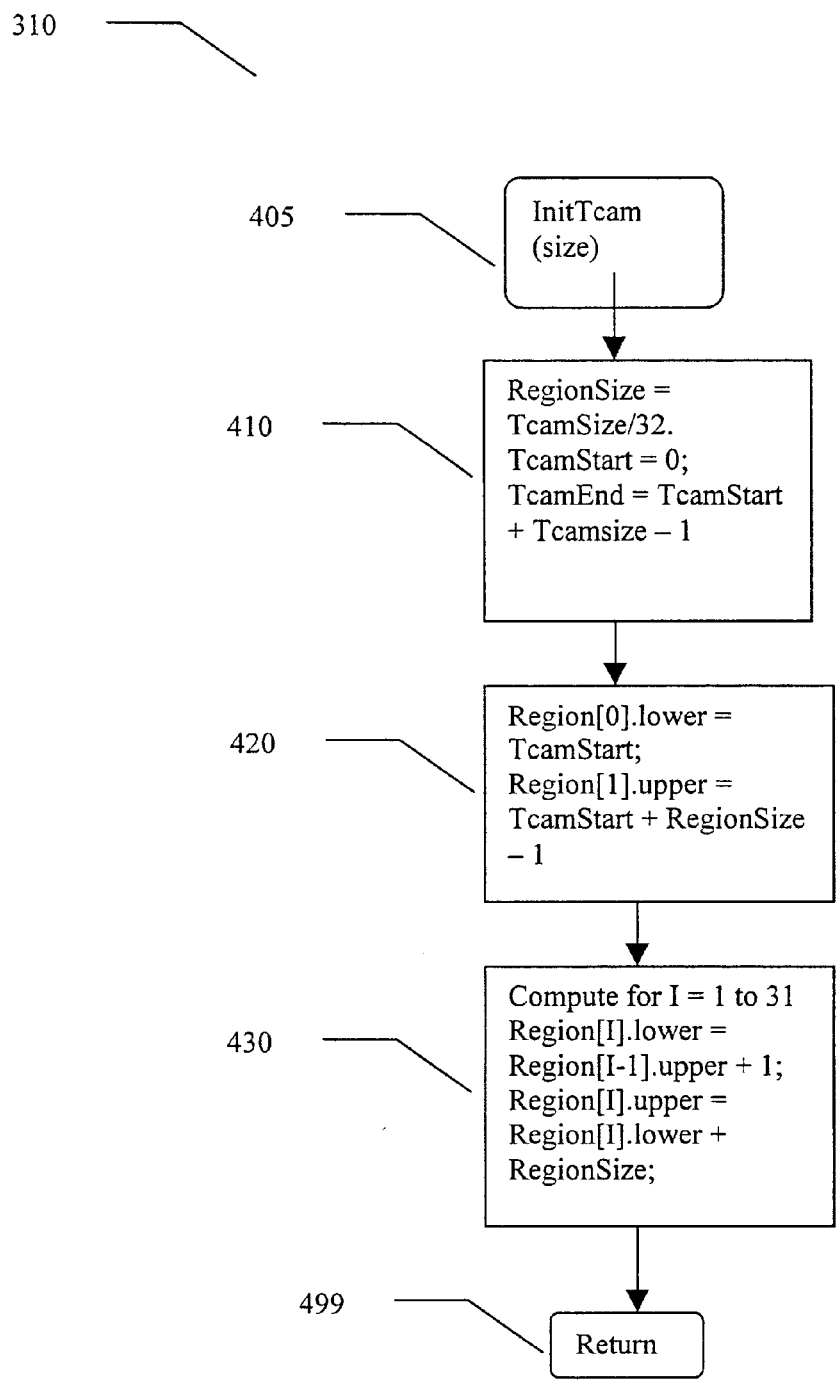
FIG. 4 is a flowchart of initialization procedure 310.

Option Zero:

Option Zero is illustrated in FIG. 3. Initialization step 310 (referring now to FIG. 4) begins the algorithm by determining the size of the TCAM by conventional means in step 405. This may be accomplished by reading a stored parameter or by a dynamic determination using means well-known to one of ordinary skill in the art.

Next, various parameters defining the 32 prefix-length determined regions are initialized in steps 410, 420, and 430. In particular, step 430 iterates in a loop to initialize each region's initial upper and lower bounds, based on a Region-Size defined by dividing the entire TCAM (TcamSize) into 32 equal regions. The initialization step 310 ends with a return 499 to Option 0.

This process is entirely analogous to (albeit shorter) that used to maintain a TCAM in the IPv6 environment and its associated 128 regions. Accordingly, the present invention and its several embodiments are not limited to the IPv4 application alone.

Referring back to FIG. 3, in step 312 a local parameter Region_just_modified is set to zero and counter i is set to Region_just_modified (step 320). Procedure Equalize is then called in step 330. Equalize 330 is further described in FIG. 5.

Equalize 330 begins (referring now to FIG. 5) by checking to see if the region i has fewer holes than its neighbor region (i.e., the neighbor region immediately above or higher than region i in the TCAM, that neighbor having one more bit in the prefix length) in step 510. If the difference between the number of holes in the current region and the neighbor is greater than or equal to two, then the process borrows a hole from that neighbor (i.e., moves the hole from the neighbor i+1 into the current region i), step 520. If the current region has more than two holes less than its neighbor, the process donates a hole to that neighbor in step 525. In either case, return to the invoking process afterwards, step 599.

If the number of holes in region i differs from the number of holes in the neighbor by less than two, the process does nothing and returns 599.

Figure 6:
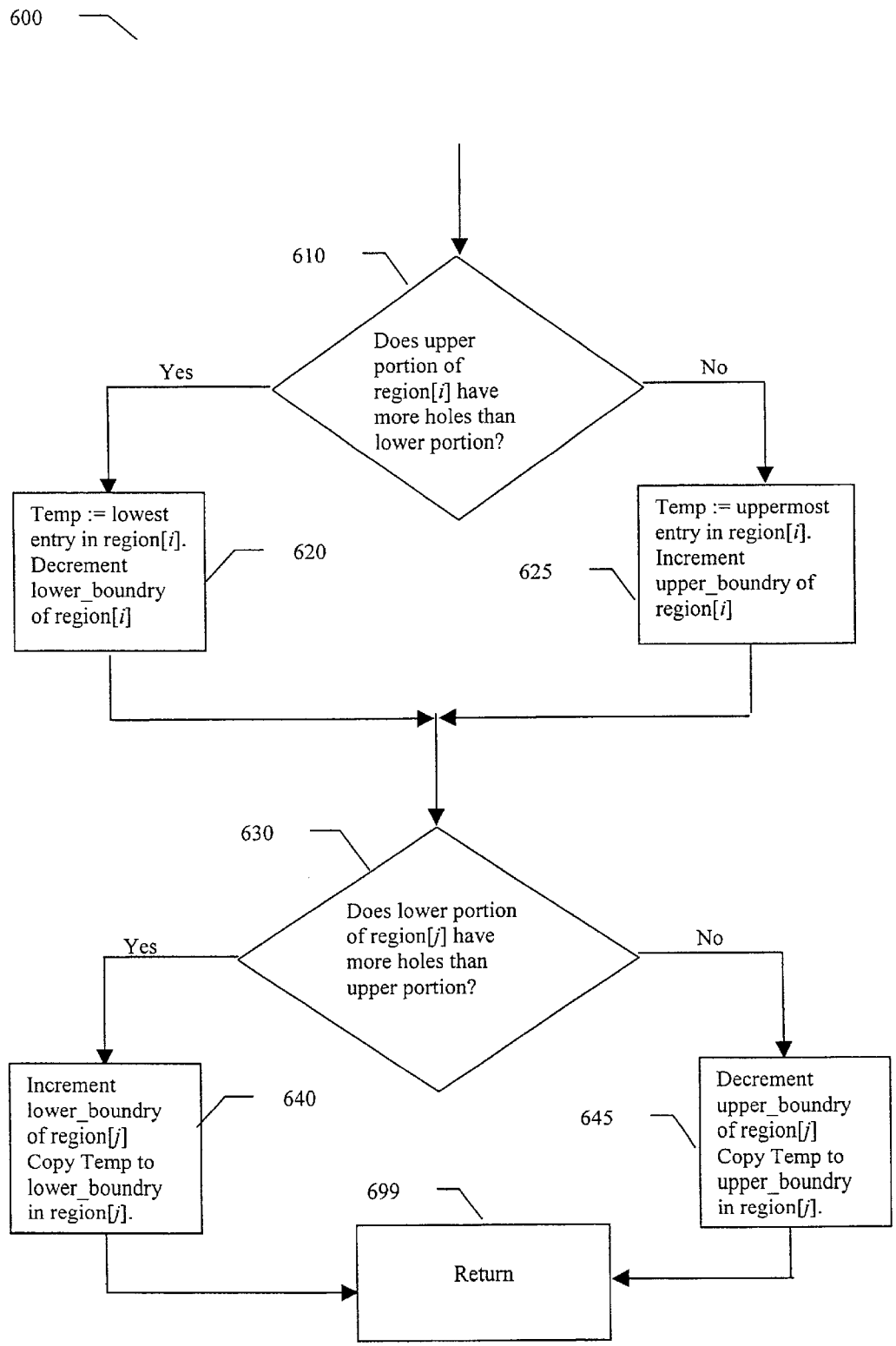
FIG. 6 is a flowchart of move primitive 600.

Although a decision is made based on having two or more holes difference is described, those skilled in the art will realize that hole difference thresholds greater than two can be used. Accordingly, the invention is not limited to any particular type of hole difference thresholds. Both the borrowing (step 520) and the donating (step 525) procedures are carried out by the Move primitive 600, shown in FIG. 6.

Move primitive 600 moves an entry from region i to region j by first testing if the upper portion of region i (the first listed input region to the procedure) has more entries than the lower portion in step 610. One of ordinary skill in the art can readily see that such a test is easily accomplished, in one in one embodiment of the present invention by a quick iterative read of the entries of the given region.

If the upper portion of the region has more holes, control passes through step 620, in which a temporary variable is set equal to the lowest entry in region i and the lower boundary of region i is decremented by one. Otherwise, if the lower portion of the region has more holes (or the same number of holes), Temp is set to the uppermost entry in i and the upper boundary is incremented.

Next, in step 630, region j is tested in similar fashion. If the lower portion of region j has more holes than the upper, the lower boundary of region j is incremented and Temp is written to the new lower boundary position in region j, step 640. If, on the other hand, the upper portion has an equal number or more holes than the lower portion, the upper boundary of region j is decremented and Temp is copied into the new upper boundary of j.

Figure 5:
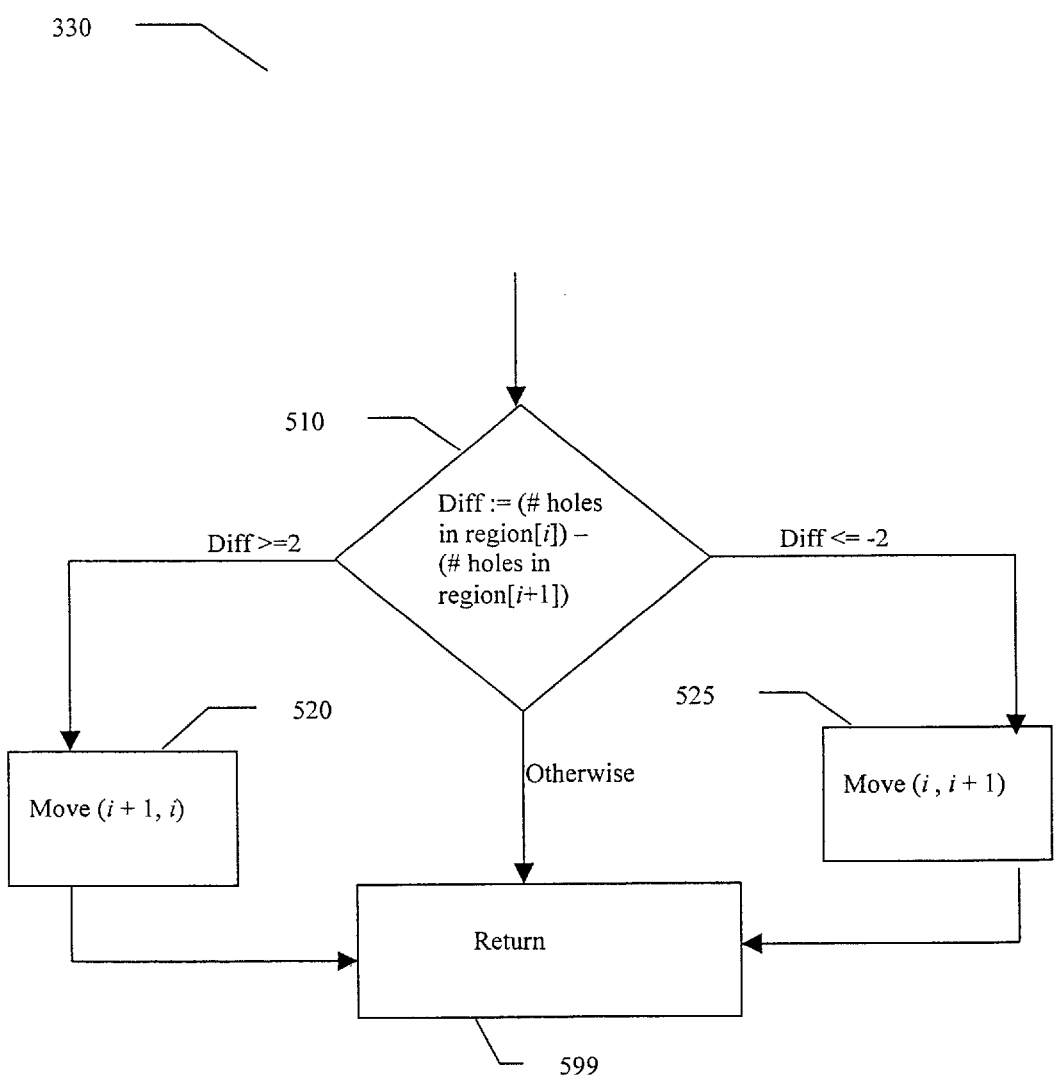
FIG. 5 is a flowchart of equalize procedure 330.

After moving the entry, control returns (step 699) to equalize 330 in FIG. 5 and thence returns (in step 599) to the Option 0 procedure shown in FIG. 3 at step 332. Here the process repeats equalize procedure 330 (and the related moves 600) for the region immediately below region i (i.e., region i−1), in order to preserve the hole distribution in that region in case a "borrow" was required to create enough holes in region i.

Figure 7:
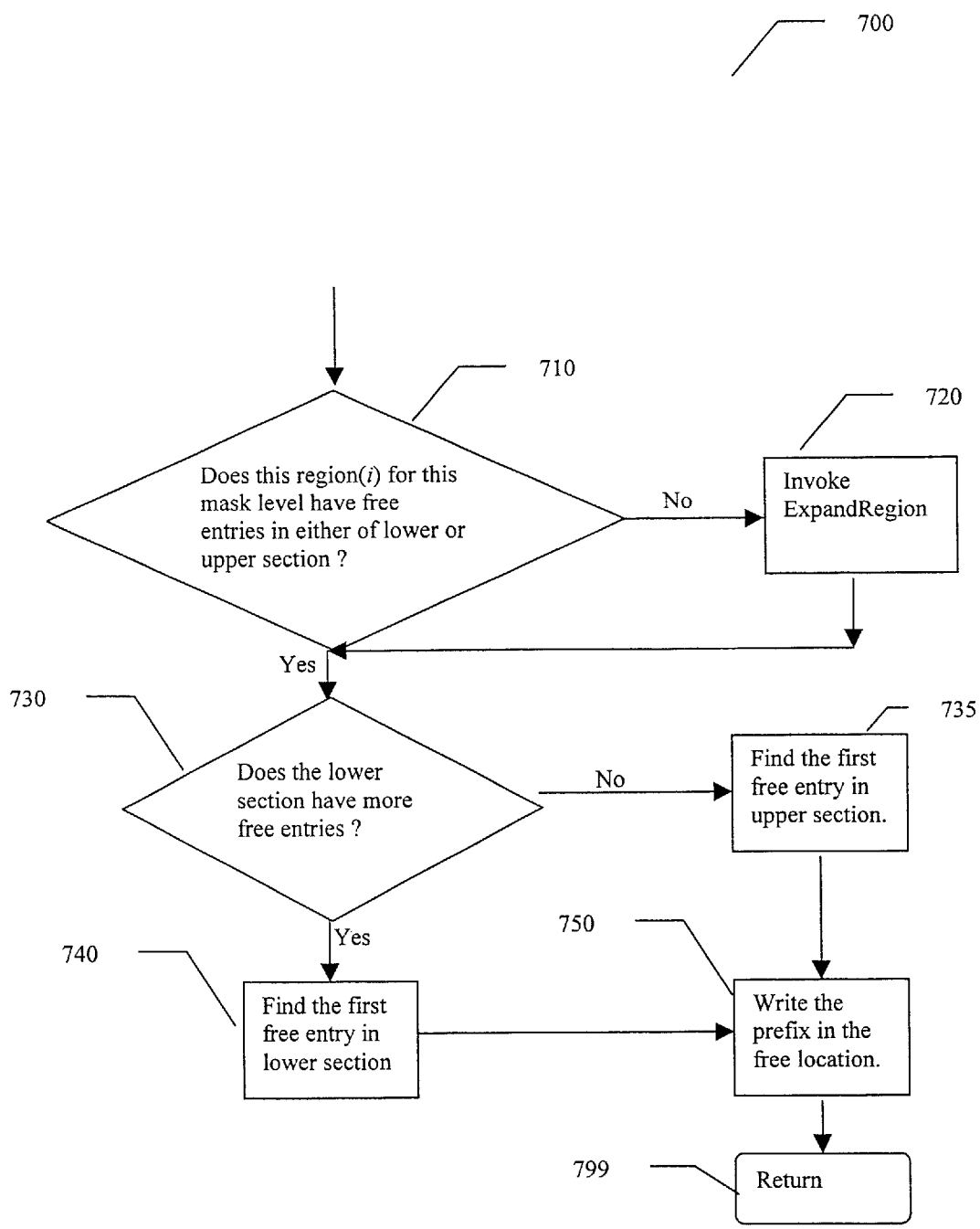
FIG. 7 is a flowchart of insert procedure 700.

Option 0 next proceeds to wait loop 350, during which it waits for an externally commanded TCAM update, i.e., either an insertion (store) of a prefix entry into, or a deletion of a prefix entry from, the TCAM. When an insertion is commanded, the insert prefix procedure 700 (shown in FIG. 7) is invoked; insert 700 in turn invokes expand procedure 720 (shown in FIG. 8) when required. When a deletion is commanded, the delete prefix procedure 900 (shown in FIG. 9) is invoked.

To insert a prefix entry in a given region i, insert procedure 700 (referring now to FIG. 7) first tests if the region i has a hole (free entry) in either the upper or lower portions of the region, step 710. If not, the region must be expanded by procedure ExpandRegion, step 720 (discussed below with respect to FIG. 8). If there is a hole, step 730 tests if it is the lower portion (section) of the region and, if so, finds the first free entry (step 740) and writes the prefix entry into that location, 750.

Conversely, if the free entry is in the upper portion, step 735 finds the hole and writes the prefix entry into the hole in step 750. Control then exits wait loop 350 via return 799 and passes to step 320, shown in FIG. 3. Region_just_modified is set to the region i where the insert command was just executed.

Figure 8:
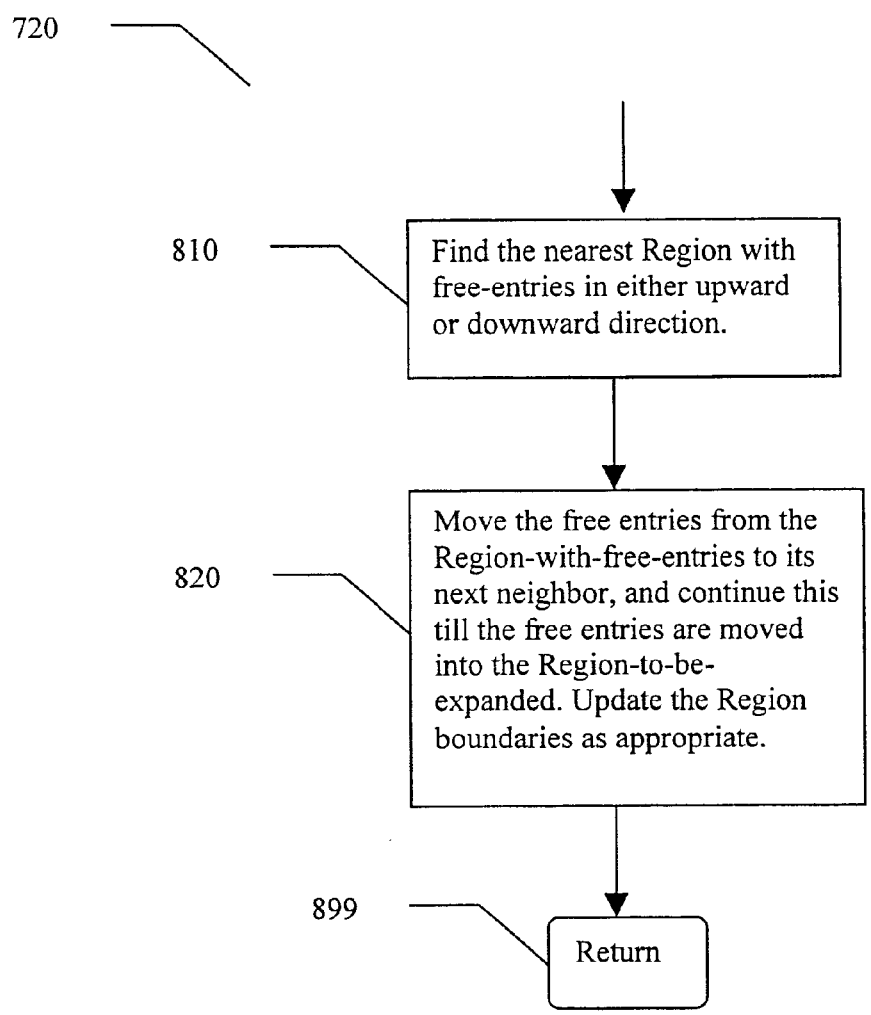
FIG. 8 is a flowchart of ExpandRegion procedure 720.
Figure 9:
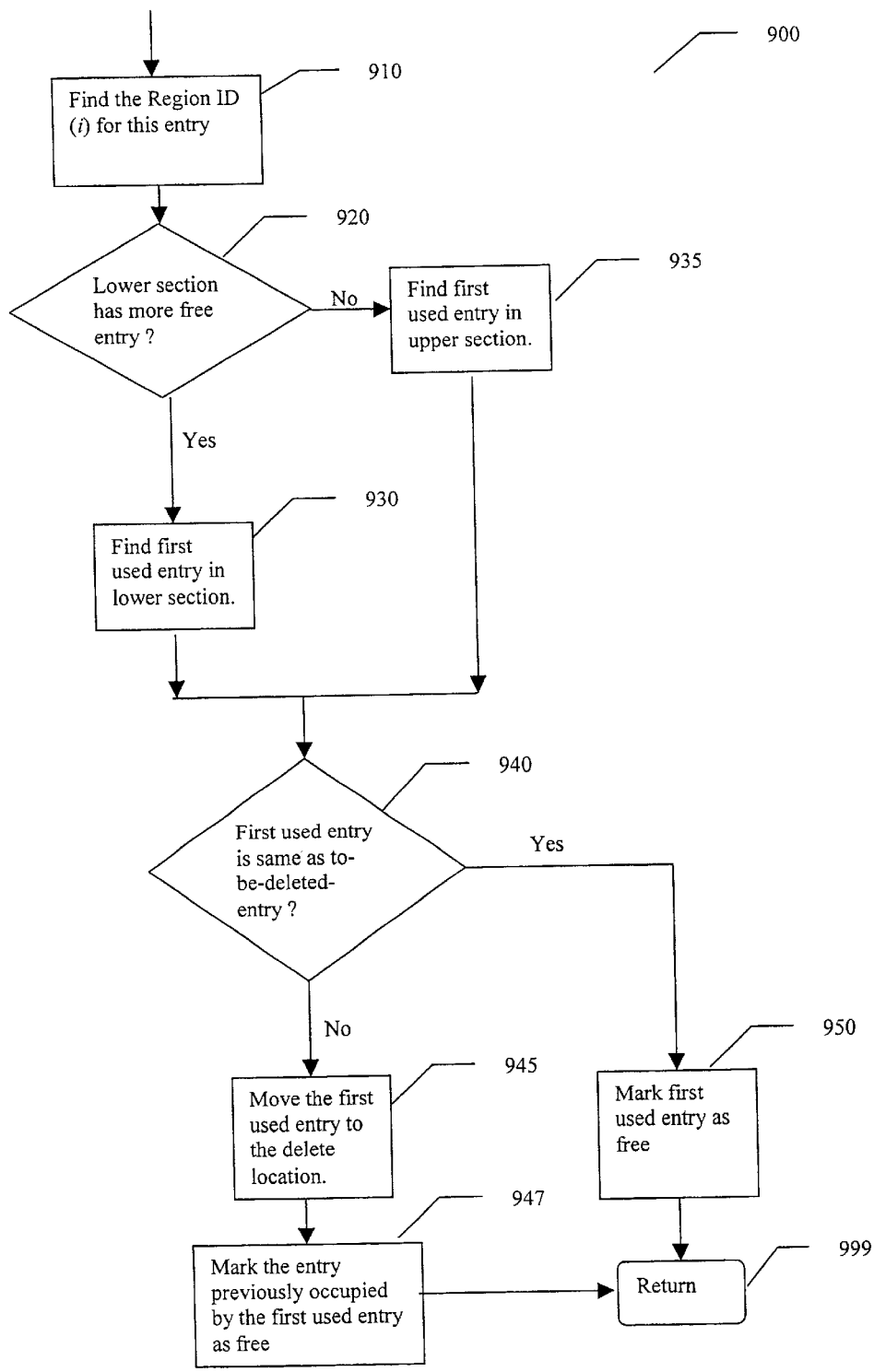
FIG. 9 is a flowchart of delete procedure 900.

ExpandRegion step 720 is further detailed by reference to FIG. 8. First, the process identifies the nearest region with free entries (holes) in either the upward (i+) or downward (i−) directions, step 810. In one embodiment, identification 810 is conducted by a simple iterative search, alternating between i+n and i−n, where n={1, 2, 3 . . . } until a hole is found. Once found, the process repeats move procedure 600 to move a hole from its original location (i±n) into the current region i needing to be expanded in step 820. As the nearest hole may be more than one region away, several iterations may be required to move the hole into region i. Once the hole is available in region i, ExpandRegion process 720 returns control (step 899) to step 730.

To delete a prefix entry from the TCAM, procedure 900 begins in step 910 (referring now to FIG. 9) by determining the region ID i from which the deletion is commanded. This may be performed, for example, by examining the number of bits in the prefix to identify the TCAM region. If the lower portion (section) of the target region i has more free entries (holes) than the upper portion, the procedure finds the first used entry (non-hole) in the lower section, step 930. Otherwise, the procedure finds the first used entry in the upper section, step 935. If the first used entry is not the entry to be deleted in test 940, the first used entry is moved (invoking move procedure 600) to the deletion location, step 945. The entry previously occupied by the first used entry is marked as free (available, unoccupied) in step 947. If the first used entry is to be deleted, then that location is simply marked as free, i.e., flagged as a hole rather than a used entry, step 950.

Control then exits wait loop 350 and returns, step 999, to step 320 in FIG. 3. Once again, Region_just_modified is the region i where the delete command was just executed.

As an example of one embodiment of initialization 310, insert 700, delete 900, and/or move 600 of the present invention, the following software code sequence may be used one of ordinary skill in the art will recognize that many other codings and languages may easily be used without undue experimentation to perform these functions. Additionally, while these procedures are expressed in terms of software, dedicated hardware devices can also be used though means equally well-known in the art.

```
/*
 * All code © Cisco Systems, Inc. 2000
 * PrefixRegion Structure initialization 310 (partial code)
 *
 * Is an ordered Set of Regions. One Region for each 33
 * (0 . . 32) masklevels.
 */
struct prefixRegion_ {
    Region Regions [0 . . 32]
}
/*
 * Region Structure
 *
 * Each Region is viewed as 2 sections, upper and lower.
 * Lower section grows downwards, away from middle of Region.
 * Upper section grows upwards, away from middle of Region.
 */
struct Region_ {
    uchar  id;      /* Region index */
    ulong  llimit;  /* lower boundary */
    ulong  lfree;   /* # of free loc in lower section */
    ulong  lnext;   /* next loc 2insert in lower section */
                    /* all allocated entries here */
    ulong  unext;   /* next loc 2insert in upper section */
    ulong  ufree;   /* # of free loc in upper section */
    ulong  ulimit;  /* upper boundary */
}
/*
 *--------------------------------------------------------
 *
 * DeletePrefix 900
 *
 * Description:
 *
 * This routine is called for Prefix Deletion.
 *
 * Input - entry : Location of Key
 * Output - Success/Failure
 *
 *--------------------------------------------------------
 */
boolean DeletePrefix (entry)
{
    /*
     * Free and compact location in appropriate section.
     * If lower section has more free entries, then move
     * from upper section's boundary.
     */
    if (Region.id == 0) {
        Region.ufree++;
        Region.unext--;
        compact = Region.unext;
    } else if (Region.id == last) {
        Region.lfree++;
        Region.lnext++;
        compact = Region.lnext;
    } else {
        if (Region.lfree > Region.ufree) {
            Region.ufree++;
            Region.unext--;
            compact = Region.unext;
        } else {
            Region.lfree++;
            Region.lnext++;
```

-continued

```
        compact = Region.lnext;
      }
    }
    /*
     * If the delete is in the boundary, then no need to
     * compact.
     */
    if (entry == compact ) {
      return;
    }
    /*
     * Move compact-location to delete-location
     * and invalidate compact_p
     */
    MovePrefix (compact, entry);
    return (SUCCESS);
}
/*
*---------------------------------------------------------
*
* InsertPrefix 700
*
* Description:
*
* This routine is called for Prefix Insertion.
*
* Input - Key : Prefix Key
* Output - TCAM Location
*
*
*---------------------------------------------------------
*/
ulong InsertPrefix (Key, Mask)
{
    Region = Prefix.Regions [MaskLevel]
    /*
     * Need to expand ?
     */
    if (!Region.lfree && !Region.ufree) {
      if (!ExpandRegion(Region)) {
        return (0);
      }
    }
    /*
     * Allocate in the appropriate section, the section with
     * with more free entries. Idea is to keep the section
     * balanced and in the middle.
     */
    if (Region.lfree > Region.ufree) {
      alloc = Region.lnext;
      Region.lnext--;
      Region.lfree--;
    } else {
      alloc = Region.unext;
      Region.unext++;
      Region.ufree--;
    }
    return (alloc);
}
/*
*---------------------------------------------------------
*
* MovePrefix 600
*
* Description:
*
* This routine is called for SDM Longest-Match Region Region
* Expansion, to move one entry to another entry within a Region.
*
*---------------------------------------------------------
*/
void MovePrefix (sentry, dentry)
{
    /*
     * Update destination entry, with source entry's key
     */
```

-continued

```
    dentry = sentry;
    /*
     * Mark the source entry as Free.
     */
    return;
}
```

Figure 1:
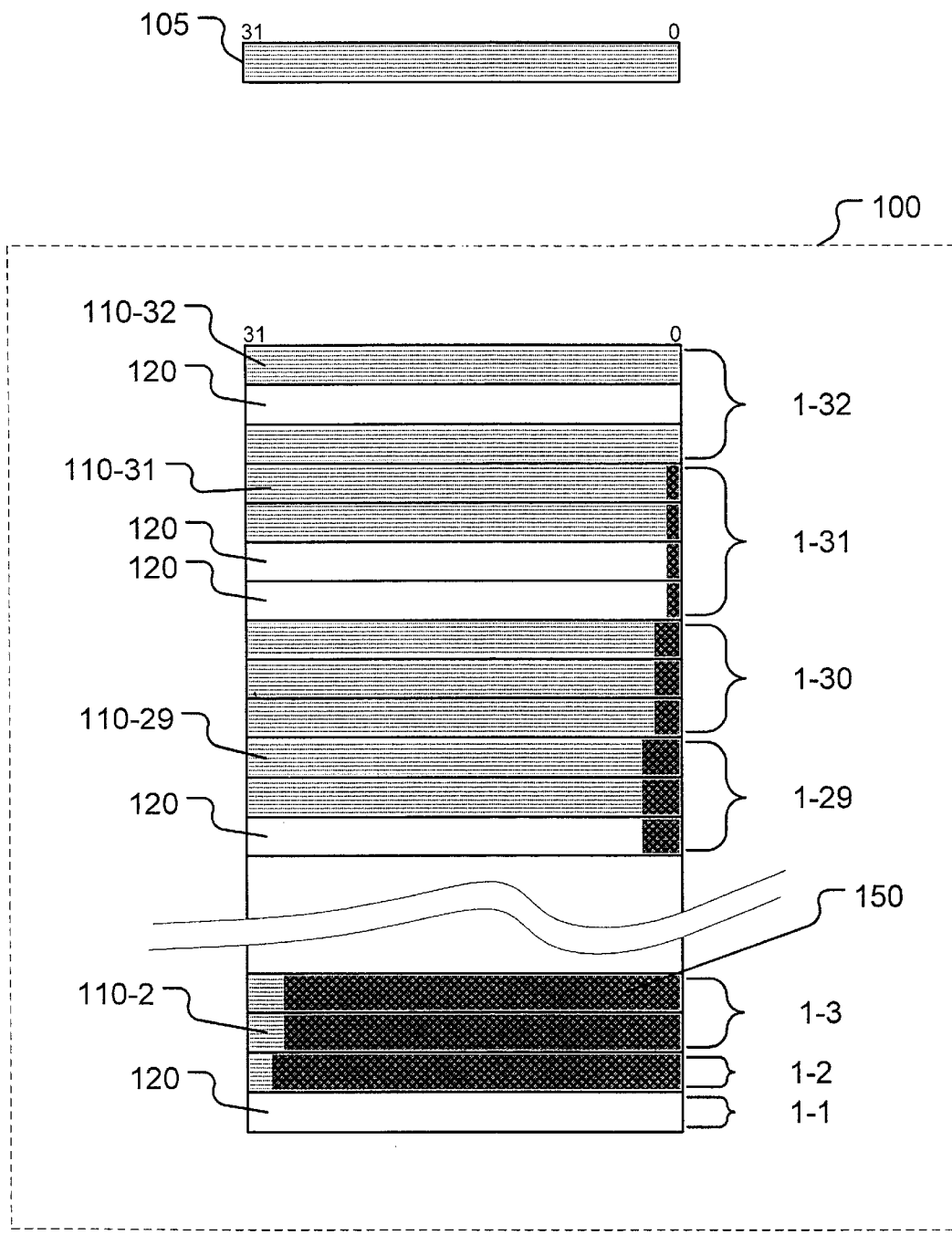
FIG. 1 illustrates the structure of a part of a prior art IP prefix table implemented within a TCAM.
Figure 10:
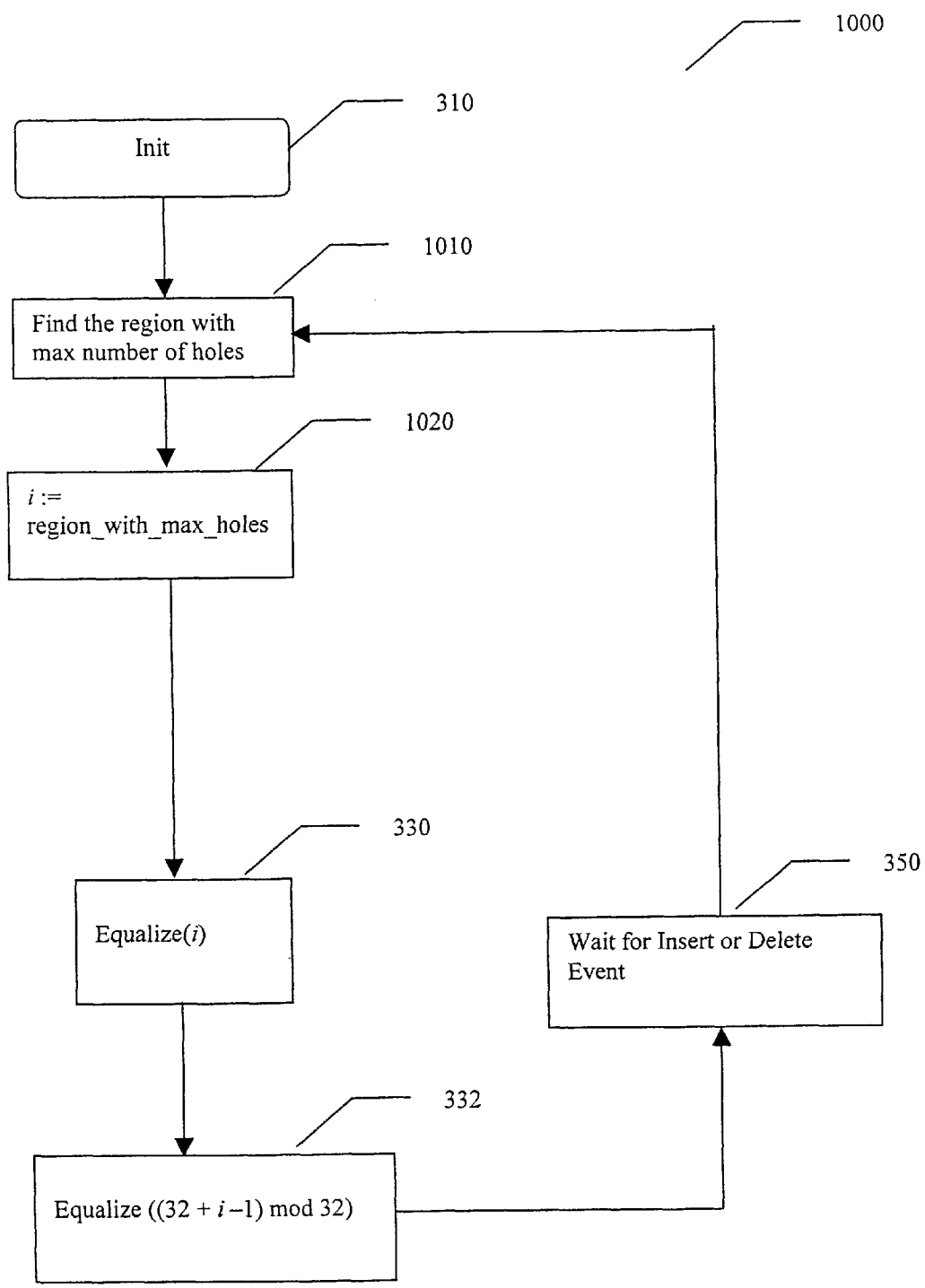
FIG. 10 is a flowchart of the method according to the Option One embodiment of the present invention.

Option One:

The Option One algorithm 1000 begins with initialization step 310 (discussed with reference to FIG. 1) as depicted in FIG. 10. In the next step 1010, however, algorithm 1000 determines which region contains the largest number of holes, setting i equal to the identifier of that region in step 1020. The Option One procedure then moves a hole from this region i to one of its neighbors provided that neighbor contains at least two holes less than the maximum number of holes allowed, as before in steps 330 and 332. Algorithm 1000 then enters wait loop 350, again as described 10 above with respect to Option Zero.

After completing an insertion 700 or a deletion 900, control returns to step 1010.

Figure 11:
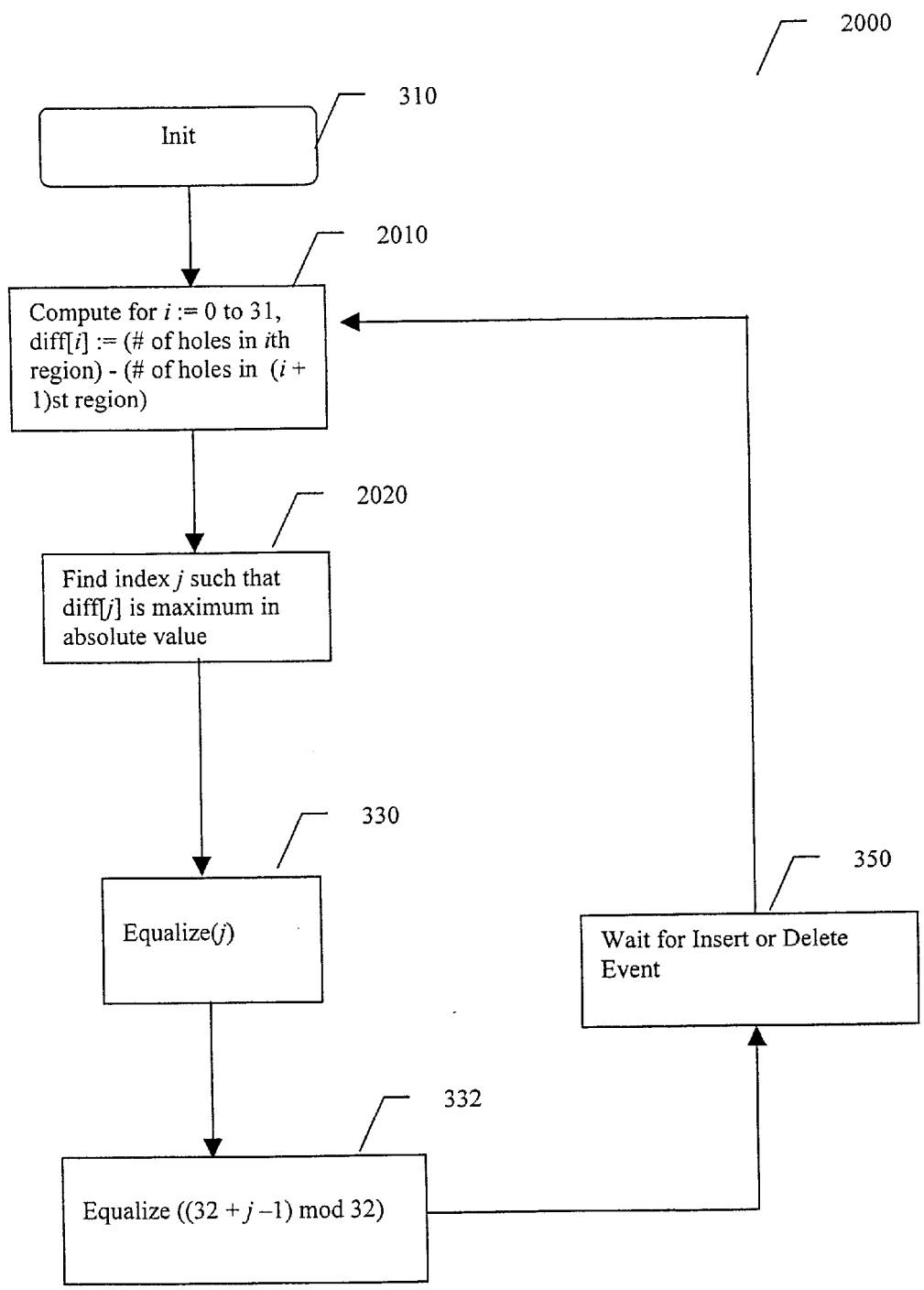
FIG. 11 is a flowchart of the method according to the Option Two embodiment of the present invention.

Option Two:

The Option Two algorithm 2000 also begins with initialization 310, shown in FIG. 11. Here, algorithm 2000 keeps track of the differences between the number of holes in adjoining regions in step 2010 and 2020. In an IPv4 system, there will be 31 such differences; in IPv6 there will be 127. After each TCAM insert 700 or deletion 900 (executed within wait loop 350, as in Option Zero), equalize 330 and equalize 332 adjust the region having the largest difference in the number of holes with respect to its adjoining regions by performing one move; i.e., move a hole from the region richest in holes to the poorer of the two regions adjacent to the richest region. The equalizing adjustment moves will only be performed if the difference is at least two holes, as above.

Figure 12:
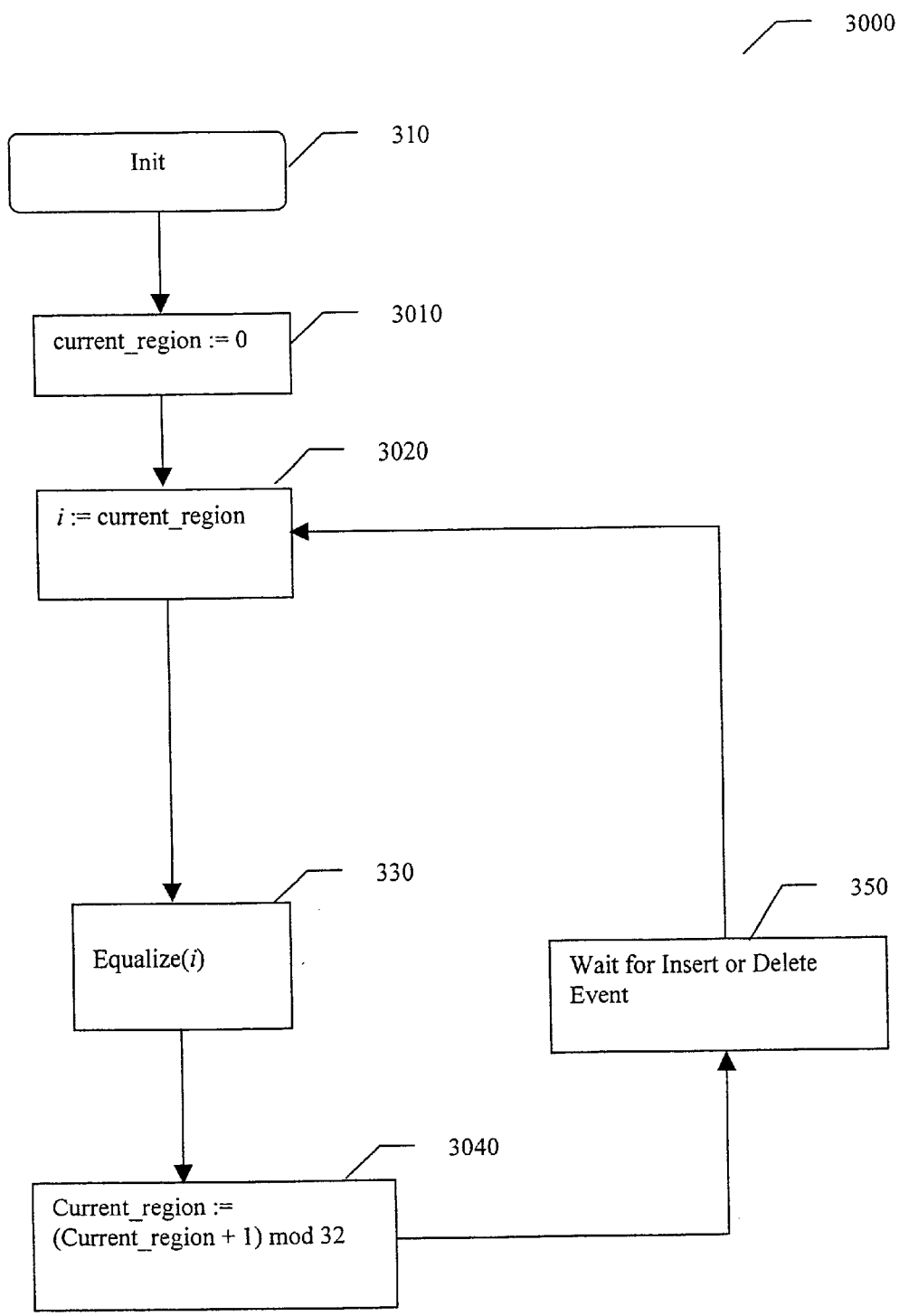
FIG. 12 is a flowchart of the method according to the Option Three embodiment of the present invention.

Option Three:

The Option Three algorithm 3000 also begins with initialization 310, shown in FIG. 12. Algorithm 3000 maintains a single pointer i to the current region of interest. Current_region is initially set to zero, step 3010, and index i is set to current_region in step 3020. Region i is equalized 330 and the current_region is incremented (with wrap-around) according to step 3040. Algorithm 3000 then enters wait loop 350 as above.

Control returns to step 3020 after each update (i.e., each insert 700 or delete 900 occurring inside wait loop 350) and algorithm 3000 proceeds to equalize the holes in step 330. As discussed above with respect to Option Zero, equalization is (in some embodiments of the present invention) performed by comparing the number of holes between the $i^{th}$ region and the $i^{th}+1$ region. If the difference is at least two holes, then move a hole from the richer to the poorer one. Thus, when using algorithm 3000 one cycles through all of the regions one at a time and performs equalizing moves when necessary, but without regard to where the most recent insert or delete has taken place.

Figure 13:
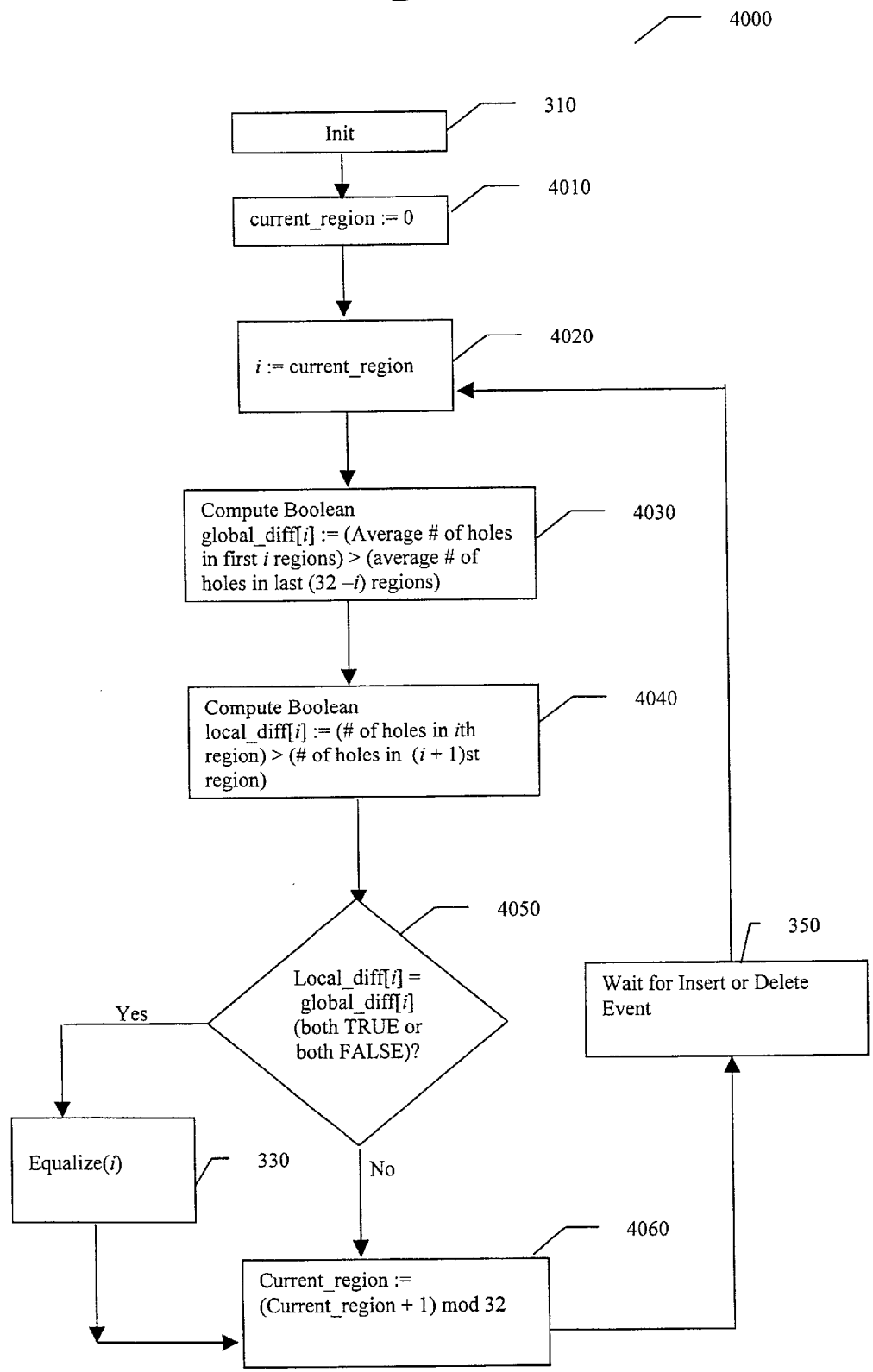
FIG. 13 is a flowchart of the method according to the Option Four embodiment of the present invention.

Option Four:

The Option Four algorithm 4000 begins with initialization 310, shown in FIG. 13. Algorithm 4000 maintains a single pointer i to the current_region of interest. Current_region is initially set to zero, step 4010, and index i is set to current_region in step 4020. For each index pointer i, algorithm 4000 keeps track of the average number of holes in the first i regions, and maintain two Booleans, global_diff[i] and local_diff[i], in steps 4030 and 4040.

Booleans global_diff[i] and local_diff[i] are defined as follows: global_diff[i] is TRUE if the average number of holes in a group containing the first i regions is greater than the total average. Local_diff[i] is TRUE if the $i^{th}$ region has more holes than the $i^{th}+1$ region.

Thus, there will always be some i for which global_diff[i] and local_diff[i] are equal, namely either both TRUE or both FALSE. For every TCAM update, test i (in step 4050) and perform an equalizing move (step 330) between the $i^{th}$ and the $i^{th}+1$ region if local_diff[i]=global_diff[i].

Algorithm 4000 then increments current_region in step 4060 and enters wait loop 350 until an insert 700 or delete 900 is commanded. Control then returns to step 4020.

Options Compared

To see the advantages and disadvantages of the various options discussed above, imagine a scenario where TCAM updates are combined with equalizing moves. For the moment, ignore the effect of the updates themselves and focus only on the equalizing moves. In Options Three and Four only, it is not hard to show that if one starts with any distribution of holes, no matter how bad, if one keeps performing the equalizing moves the system will eventually reach a good distribution. In fact, any two adjoining regions can eventually differ in at most one hole after applying any one of the above equalizing options. The question then arises: How soon does the system reach a good distribution, given that it begins in a bad distribution of holes, by performing one or another of these equalizing methods?

Option Zero seems to perform local equalizing moves with one TCAM insert, however this will generally not be sufficient to keep up with the distortion of the distribution created by the TCAM updates. For example, if initially all the holes are in the first three regions and all inserts and deletes take place in these regions, then the holes continue to remain in the first four regions and never distribute across all regions.

Option One achieves the objective of distributing holes, but only very slowly. For example, if there are m regions and (mk) holes, all initially in the first region, then it takes $O(km^2)$ moves to get at least one hole per region, although this can be achieved in $O(m^2)$ moves.

Option Three performs no more than twice the optimal (i.e., minimal) number of moves to reach a good distribution, however it also operates (i.e., gets to a good distribution) very slowly. In fact, given a certain pattern of TCAM updates starting with a good distribution, a full region will be attained by the prior art naive (lazy) algorithm even before that of Option Three. However, of the five options presented herein (Options Zero through Four), Option Three provides the best performance vs. complexity compromise.

Option Four performs the minimal number of moves required to create an equal distribution, and thus can optimize distribution sooner than all of the other algorithms. (The theoretical minimum number of equalizing moves is the number of holes k divided by the number of regions m.) On the negative side, however, a hardware, firmware, or software implementation of Option Four appears to be more complex than all other options.

Although the application of the various alternative algorithms are discussed in the context of the IPv6 protocol is described, those skilled in the art will realize that applications employing the characteristics of IPv6 or other protocols can be used. Accordingly, the invention is not limited to applications using any particular packet protocol.

The above methodology can be favorably compared to the table maintenance schemes taught by the Noven patents U.S. Pat. Nos. 5,809,501 and 5,884,297 noted above. The Noven patents are drawn towards maintaining vacant entries (holes) in a sorted memory, such as an SRAM simulating a CAM or a CAM itself. However, the Noven patents do not address a memory organized into the regions required for longest IP prefix matching. Also, because neither of the Noven teachings keep holes compacted within a given region, they both suffer from the defect of having to find holes as discussed above.

Alternate Embodiments

The order in which the steps of the present methods are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. A method of memory management comprising the steps of:

dividing a memory into a plurality of contiguous regions ordered from the lowest to the highest, each said region composed of a plurality of entries, wherein each said entry is either a used entry or a hole;

iteratively:

equalizing a first designated region to maintain all used entries in a first contiguous sub-region adjoining a second contiguous sub-region containing all holes;

when commanded inserting a value in one of said entries in a second designated region, said second designated region being any one of said plurality of contiguous regions, wherein said inserting further comprises:

if said second designated region lacks a hole, expanding said second designated region by moving one of said holes from an adjoining region; and writing said value in a hole in said second designated region; and deleting a used entry by converting said used entry into a hole.

2. The method of claim 1, wherein said second designated region contains two said second sub-regions, each said second sub-region containing only holes and adjoining said first sub-region.

3. The method of claim 1, wherein said memory comprises a content addressable memory (CAM).

4. The method of claim 1, wherein said memory comprises a ternary content addressable memory (TCAM).

5. The method of claim 1, wherein said equalizing further comprises:
   moving one of said used entries from an end of said first contiguous sub-region to a hole created by said deleting within said first contiguous sub-region; or
   adjusting the boundaries of said region to maintain a relatively equal distribution of holes in said region with respect to at least one adjoining region.

6. The method of claim 1, wherein said first designated region is the contiguous region having the most holes.

7. The method of claim 1, wherein said equalizing further comprises:
   computing the difference in number of said holes between each said contiguous region i and the next adjoining region ((i+1) modulo (the number of said plurality of contiguous regions)); and
   designating said first designated region based on having the most said difference.

8. The method of claim 1, wherein said equalizing further comprises:
   further dividing said plurality of contiguous regions into a lower group and an upper group, wherein said first group consists of all contiguous regions from said lowest region up to and including said second designated region and said second group consists of all other regions;
   computing an average number of holes in said lower group and said upper group respectively;
   determining if said average number of holes in said lower group is larger than said average number of holes in said upper group, the result of said determining forming a first Boolean;
   next determining if the number of holes in said second designated region is larger than the number of holes in the next higher region; wherein said next higher region is said lowest region when said second designated region is said highest region, the result of said next determining forming a second Boolean;
   if said first Boolean is logically equal to said second Boolean, equalizing said second designated region; and
   incrementing said second designated region to point to said next higher contiguous region.

9. A computer system for memory management, comprising computer instructions for:
   dividing a memory into a plurality of contiguous regions ordered from the lowest to the highest, each said region composed of a plurality of entries, wherein each said entry is either a used entry or a hole;
   iteratively:
      equalizing a first designated region to maintain all used entries in a first contiguous sub-region adjoining a second contiguous sub-region containing all holes;
      when commanded
         inserting a value in one of said entries in a second designated region, said second designated region being any one of said plurality of contiguous regions, wherein said inserting further comprises:
            if said second designated region lacks a hole, expanding said second designated region by moving one of said holes from an adjoining region; and
            writing said value in a hole in said second designated region; and
         deleting a used entry by converting said used entry into a hole.

10. The computer system of claim 9, wherein said second designated region contains two said second sub-regions, each said second sub-region containing only holes and adjoining said first sub-region.

11. The computer system of claim 9, wherein said memory comprises a content addressable memory (CAM).

12. The computer system of claim 9, wherein said memory comprises a ternary content addressable memory (TCAM).

13. The computer system of claim 9, wherein said equalizing further comprises:
   moving one of said used entries from an end of said first contiguous sub-region to a hole created by said deleting within said first contiguous sub-region; or
   adjusting the boundaries of said region to maintain a relatively equal distribution of holes in said region with respect to at least one adjoining region.

14. The computer system of claim 9, wherein said first designated region is the contiguous region having the most holes.

15. The computer system of claim 9, wherein said equalizing further comprises:
   computing the difference in number of said holes between each said contiguous region i and the next adjoining region ((i+1) modulo (the number of said plurality of contiguous regions)); and
   designating said first designated region based on having the most said difference.

16. The computer system of claim 9, wherein said equalizing further comprises:
   further dividing said plurality of contiguous regions into a lower group and an upper group, wherein said first group consists of all contiguous regions from said lowest region up to and including said second designated region and said second group consists of all other regions;
   computing an average number of holes in said lower group and said upper group respectively;
   determining if said average number of holes in said lower group is larger than said average number of holes in said upper group, the result of said determining forming a first Boolean;
   next determining if the number of holes in said second designated region is larger than the number of holes in the next higher region; wherein said next higher region is said lowest region when said second designated region is said highest region, the result of said next determining forming a second Boolean;
   if said first Boolean is logically equal to said second Boolean, equalizing said second designated region; and
   incrementing said second designated region to point to said next higher contiguous region.

17. A computer system comprising a processor, a memory, and a network interface, said processor configured to perform the steps of:
   dividing a memory into a plurality of contiguous regions ordered from the lowest to the highest, each said region composed of a plurality of entries, wherein each said entry is either a used entry or a hole;
   iteratively:
      equalizing a first designated region to maintain all used entries in a first contiguous sub-region adjoining a second contiguous sub-region containing all holes;

when commanded inserting a value in one of said entries in a second designated region, said second designated region being any one of said plurality of contiguous regions, wherein said inserting further comprises:

if said second designated region lacks a hole, expanding said second designated region by moving one of said holes from an adjoining region; and writing said value in a hole in said second designated region; and deleting a used entry by converting said used entry into a hole.

18. The computer system of claim 17, wherein said second designated region contains two said second sub-regions, each said second sub-region containing only holes and adjoining said first sub-region.

19. The computer system of claim 17, wherein said memory comprises a content addressable memory (CAM).

20. The computer system of claim 17, wherein said memory comprises a ternary content addressable memory (TCAM).

21. The computer system of claim 17, wherein said equalizing further comprises:

moving one of said used entries from an end of said first contiguous sub-region to a hole created by said deleting within said first contiguous sub-region; or adjusting the boundaries of said region to maintain a relatively equal distribution of holes in said region with respect to at least one adjoining region.

22. The computer system of claim 17, wherein said first designated region is the contiguous region having the most holes.

23. The computer system of claim 17, wherein said equalizing further comprises:

computing the difference in number of said holes between each said contiguous region i and the next adjoining region ((i+1) modulo (the number of said plurality of contiguous regions)); and designating said first designated region based on having the most said difference.

24. The computer system of claim 17, wherein said equalizing further comprises:

further dividing said plurality of contiguous regions into a lower group and an upper group, wherein said first group consists of all contiguous regions from said lowest region up to and including said second designated region and said second group consists of all other regions;

computing an average number of holes in said lower group and said upper group respectively;

determining if said average number of holes in said lower group is larger than said average number of holes in said upper group, the result of said determining forming a first Boolean;

next determining if the number of holes in said second designated region is larger than the number of holes in the next higher region; wherein said next higher region is said lowest region when said second designated region is said highest region, the result of said next determining forming a second Boolean;

if said first Boolean is logically equal to said second Boolean, equalizing said second designated region; and incrementing said second designated region to point to said next higher contiguous region.

25. A computer-readable storage medium, comprising computer instructions for:

dividing a memory into a plurality of contiguous regions ordered from the lowest to the highest, each said region composed of a plurality of entries, wherein each said entry is either a used entry or a hole;

iteratively:

equalizing a first designated region to maintain all used entries in a first contiguous sub-region adjoining a second contiguous sub-region containing all holes;

when commanded inserting a value in one of said entries in a second designated region, said second designated region being any one of said plurality of contiguous regions, wherein said inserting further comprises:

if said second designated region lacks a hole, expanding said second designated region by moving one of said holes from an adjoining region; and writing said value in a hole in said second designated region; and deleting a used entry by converting said used entry into a hole.

26. The computer-readable storage medium of claim 25, wherein said second designated region contains two said second sub-regions, each said second sub-region containing only holes and adjoining said first sub-region.

27. The computer-readable storage medium of claim 25, wherein said memory comprises a content addressable memory (CAM).

28. The computer-readable storage medium of claim 25, wherein said memory comprises a ternary content addressable memory (TCAM).

29. The computer-readable storage medium of claim 25, wherein said equalizing further comprises:

moving one of said used entries from an end of said first contiguous sub-region to a hole created by said deleting within said first contiguous sub-region; or adjusting the boundaries of said region to maintain a relatively equal distribution of holes in said region with respect to at least one adjoining region.

30. The computer-readable storage medium of claim 25, wherein said first designated region is the contiguous region having the most holes.

31. The computer-readable storage medium of claim 25, wherein said equalizing further comprises:

computing the difference in number of said holes between each said contiguous region i and the next adjoining region ((i+1) modulo (the number of said plurality of contiguous regions)); and designating said first designated region based on having the most said difference.

32. The computer-readable storage medium of claim 25, wherein said equalizing further comprises:

further dividing said plurality of contiguous regions into a lower group and an upper group, wherein said first group consists of all contiguous regions from said lowest region up to and including said second designated region and said second group consists of all other regions;

computing an average number of holes in said lower group and said upper group respectively;

determining if said average number of holes in said lower group is larger than said average number of holes in said upper group, the result of said determining forming a first Boolean;

next determining if the number of holes in said second designated region is larger than the number of holes in the next higher region; wherein said next higher region is said lowest region when said second designated region is said highest region, the result of said next determining forming a second Boolean;

if said first Boolean is logically equal to said second Boolean, equalizing said second designated region; and incrementing said second designated region to point to said next higher contiguous region.

33. A computer data signal embodied in a carrier wave, comprising computer instructions for:

dividing a memory into a plurality of contiguous regions ordered from the lowest to the highest, each said region composed of a plurality of entries, wherein each said entry is either a used entry or a hole;

iteratively:

equalizing a first designated region to maintain all used entries in a first contiguous sub-region adjoining a second contiguous sub-region containing all holes;

when commanded inserting a value in one of said entries in a second designated region, said second designated region being any one of said plurality of contiguous regions, wherein said inserting further comprises:

if said second designated region lacks a hole, expanding said second designated region by moving one of said holes from an adjoining region; and writing said value in a hole in said second designated region; and deleting a used entry by converting said used entry into a hole.

34. The computer data signal of claim 33, wherein said second designated region contains two said second sub-regions, each said second sub-region containing only holes and adjoining said first sub-region.

35. The computer data signal of claim 33, wherein said memory comprises a content addressable memory (CAM).

36. The computer data signal of claim 33, wherein said memory comprises a ternary content addressable memory (TCAM).

37. The computer data signal of claim 33, wherein said equalizing further comprises:

moving one of said used entries from an end of said first contiguous sub-region to a hole created by said deleting within said first contiguous sub-region; or adjusting the boundaries of said region to maintain a relatively equal distribution of holes in said region with respect to at least one adjoining region.

38. The computer data signal of claim 33, wherein said first designated region is the contiguous region having the most holes.

39. The computer data signal of claim 33, wherein said equalizing further comprises:

computing the difference in number of said holes between each said contiguous region i and the next adjoining region ((i+1) modulo (the number of said plurality of contiguous regions)); and designating said first designated region based on having the most said difference.

40. The computer data signal of claim 33, wherein said equalizing further comprises:

further dividing said plurality of contiguous regions into a lower group and an upper group, wherein said first group consists of all contiguous regions from said lowest region up to and including said second designated region and said second group consists of all other regions;

computing an average number of holes in said lower group and said upper group respectively;

determining if said average number of holes in said lower group is larger than said average number of holes in said upper group, the result of said determining forming a first Boolean;

next determining if the number of holes in said second designated region is larger than the number of holes in the next higher region; wherein said next higher region is said lowest region when said second designated region is said highest region, the result of said next determining forming a second Boolean;

if said first Boolean is logically equal to said second Boolean, equalizing said second designated region; and incrementing said second designated region to point to said next higher contiguous region.

\* \* \* \* \*

UNITED STATES PATENT AND TRADEMARK OFFICE
CERTIFICATE OF CORRECTION

PATENT NO. : 6,725,326 B1
DATED : April 20, 2004
INVENTOR(S) : Patra et al.

It is certified that error appears in the above-identified patent and that said Letters Patent is hereby corrected as shown below:

Column 1,
Line 19, replace "modem" with -- modern --

Column 2,
Line 51, replace "1Pv6" with -- IPv6 --

Column 3,
Line 18, replace "Pv4" with -- IPv4 --
Line 27, replace "naeve" with -- naive --
Line 42, replace "Given" with -- • Given --
Line 45, replace "Even" with -- • Even --

Column 14,
Line 45, replace "Boolcan" with -- Boolean --

Signed and Sealed this

Second Day of August, 2005

JON W. DUDAS
*Director of the United States Patent and Trademark Office*